(12) United States Patent
Fang

(10) Patent No.: US 9,854,617 B1
(45) Date of Patent: Dec. 26, 2017

(54) WIRELESS CHARGING AND NETWORK CONNECTION SYSTEM AND METHOD THEREOF

(71) Applicant: NEWVASTEK CO., LTD., New Taipei (TW)

(72) Inventor: Ming Liang Fang, New Taipei (TW)

(73) Assignee: NEWVASTEK CO., LTD., New Taipei (TW)

( * ) Notice: Subject to any disclaimer, the term of this patent is extended or adjusted under 35 U.S.C. 154(b) by 0 days.

(21) Appl. No.: 15/193,098

(22) Filed: Jun. 26, 2016

(51) Int. Cl.
*H04W 76/02* (2009.01)
*H04W 4/00* (2009.01)
*H04W 48/16* (2009.01)
*H02J 7/02* (2016.01)

(52) U.S. Cl.
CPC ........... *H04W 76/023* (2013.01); *H02J 7/025* (2013.01); *H04W 4/008* (2013.01); *H04W 48/16* (2013.01)

(58) Field of Classification Search
CPC .. H02J 50/20; H02J 50/80; H02J 7/042; H02J 7/025; H04L 12/10; H04W 4/003; H04W 4/005; H04W 48/16
See application file for complete search history.

(56) References Cited

U.S. PATENT DOCUMENTS

| | | | |
|---|---|---|---|
| 2016/0094083 A1* | 3/2016 | Park | H02J 50/20 320/108 |
| 2016/0105841 A1* | 4/2016 | Kang | H04B 17/318 455/41.2 |

* cited by examiner

*Primary Examiner* — Nizar Sivji
(74) *Attorney, Agent, or Firm* — Leong C. Lei

(57) ABSTRACT

A to-be-charged electronic client device is placed on a wireless base device. An information member of the wireless base device provides pairing information to a wireless first charging member which transmits electricity signals including the pairing information in a wireless manner to the electronic client device. The electronic client device is charged by the electricity signals. In the meantime, the electronic client device pairs with a wireless first pairing member of the wireless base device. The wireless first pairing member passes a connectivity information provided by the information member to the electronic client device so that it can linked with the Internet automatically and accordingly. The present invention allows the electronic client device to access the Internet automatically while being wireless charged.

6 Claims, 7 Drawing Sheets

WIRELESS CHARGING AND NETWORK CONNECTION SYSTEM AND METHOD THEREOF

BACKGROUND OF THE INVENTION (a) Technical Field of the Invention

The present invention is generally related to wireless charging and networking, and more particular to a wireless charging and network connection system, and a related method.

(b) Description of the Prior Art

For a mobile electronic device (e.g., a cellular phone, a tablet, etc.) to access Internet through a near-by access point (AP), a user has to operate the electronic device to search for and picks an appropriate AP. Most of the time, the AP has authentication mechanism to prevent unauthorized access, and the user usually has to manually enter a password Therefore, the user has to check for the AP, prepare and enter the password, which is quite inconvenient. Additionally, the password may also be entered wrong, and the user may not be familiar the electronic device. All these may lead to failures in accessing the Internet.

SUMMARY OF THE INVENTION

Therefore, an objective of the present invention to obviate the tedious manual operations.

To achieve the objective, the present invention teaches a wireless charging and network connection system and a related method. The wireless charging and network connection system includes at least an electronic client device and a wireless base device for the optional placement of the electronic client device. The wireless base device includes at least a wireless first charging member, at least an information member, and at least a wireless first paring member, all configured in the wireless base device. The information member provides pairing information and connectivity information, and is electrically connected to the wireless first charging member and wireless first pairing member. To use the system, the to-be-charged electronic client device is placed on the wireless base device. The wireless first charging member transmits electricity signals including the pairing information to the electronic client device. The electronic client device receives and is charged by the electricity signals. In the meantime, the electronic client device pairs with a wireless first pairing member using the pairing information, and the pairing process involves the delivery of the connectivity information to the electronic client device. The connectivity information includes an account name and a corresponding password for at least a wireless network server. The electronic client device therefore data-links with the wireless network server according to the connectivity information so as to automatically access the Internet. As such, the inconvenience of checking for the AP, preparing and entering the password is avoided. The problem of incorrect password entry and user's unfamiliarity with the electronic client device or the process is obviated.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
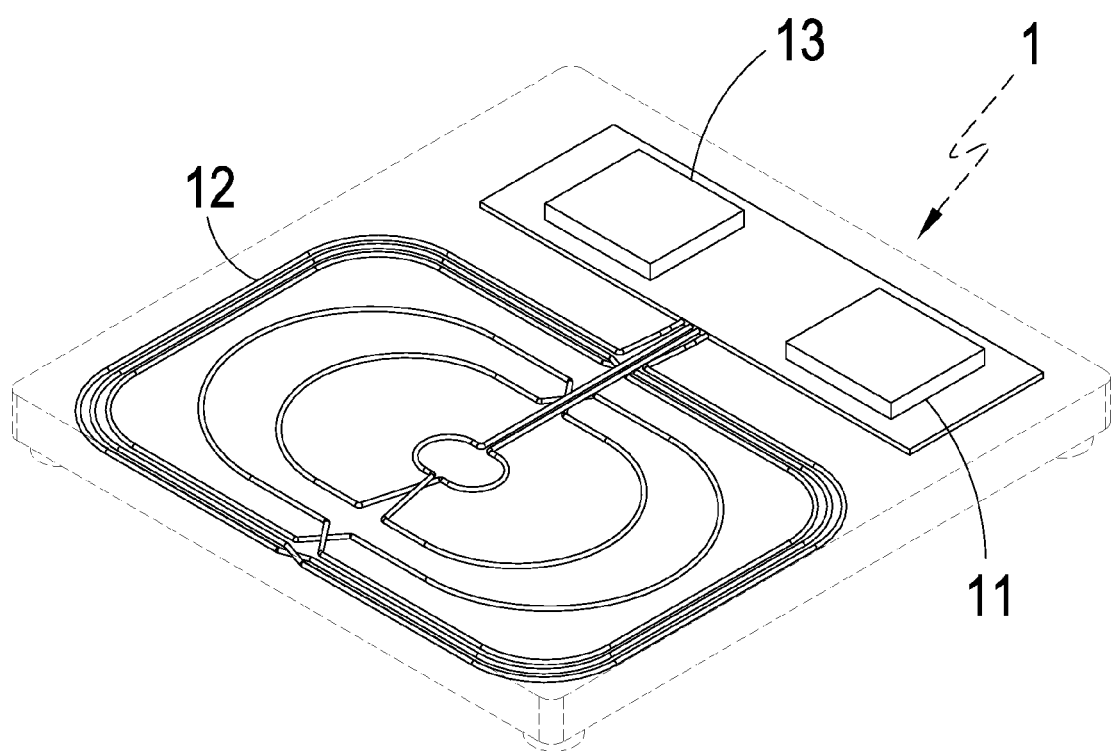
FIG. 1 is a perspective schematic diagram showing a wireless base device of a wireless charging and network connection system according to an embodiment of the present invention.
Figure 2:
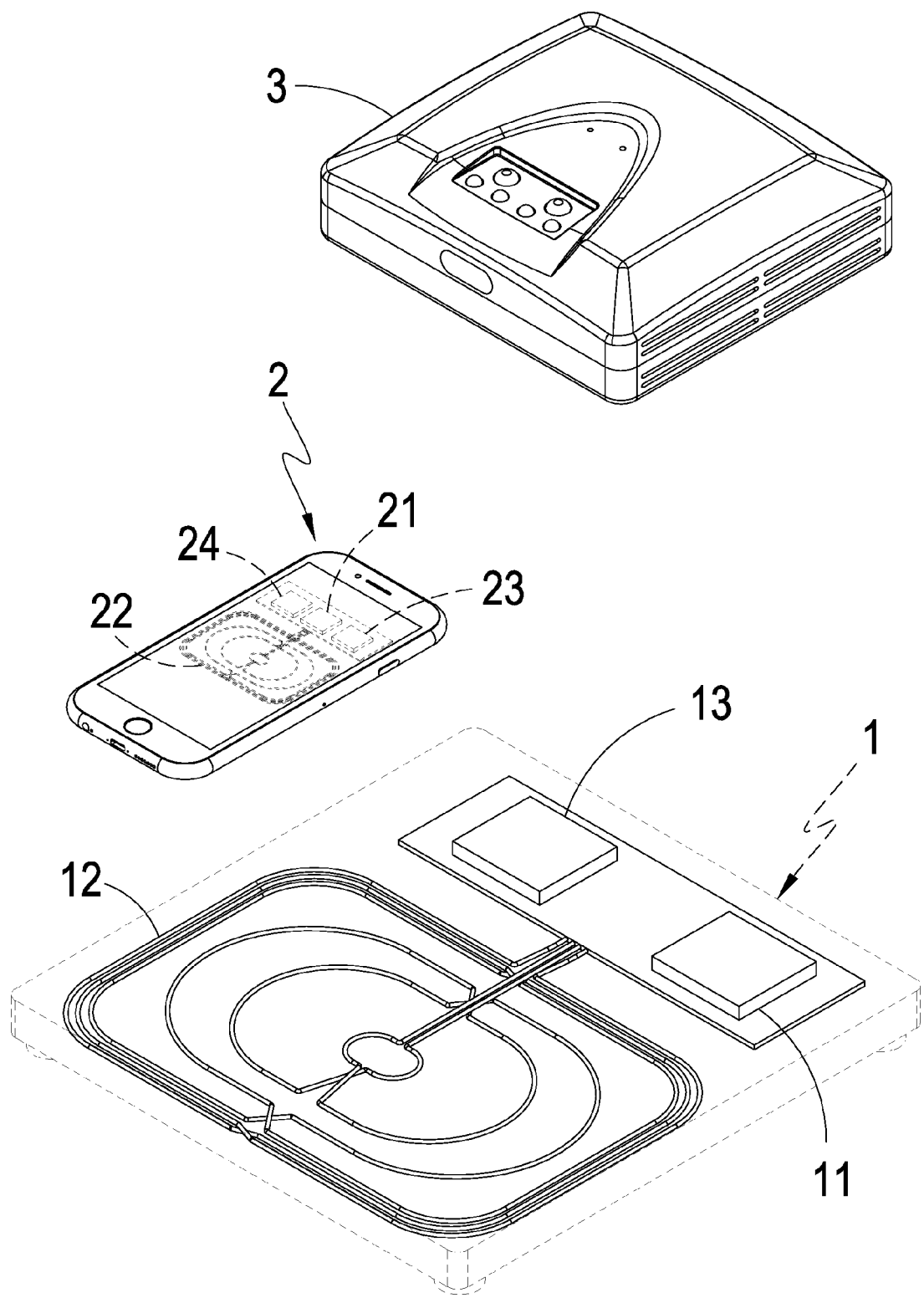
FIG. 2 is a perspective schematic diagram showing a wireless charging and network connection system according to an embodiment of the present invention.
Figure 3:
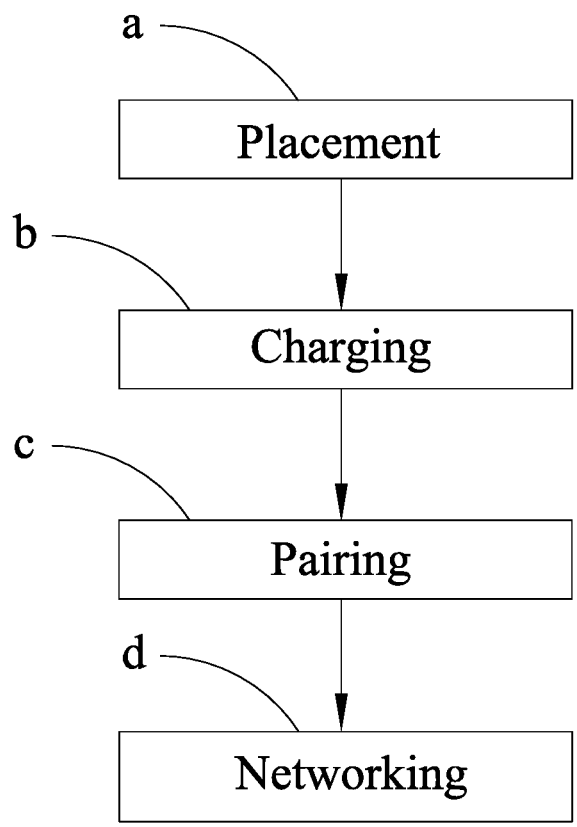
FIG. 3 is a flow diagram showing a wireless charging and network connection method according to an embodiment of the present invention.
Figure 4:
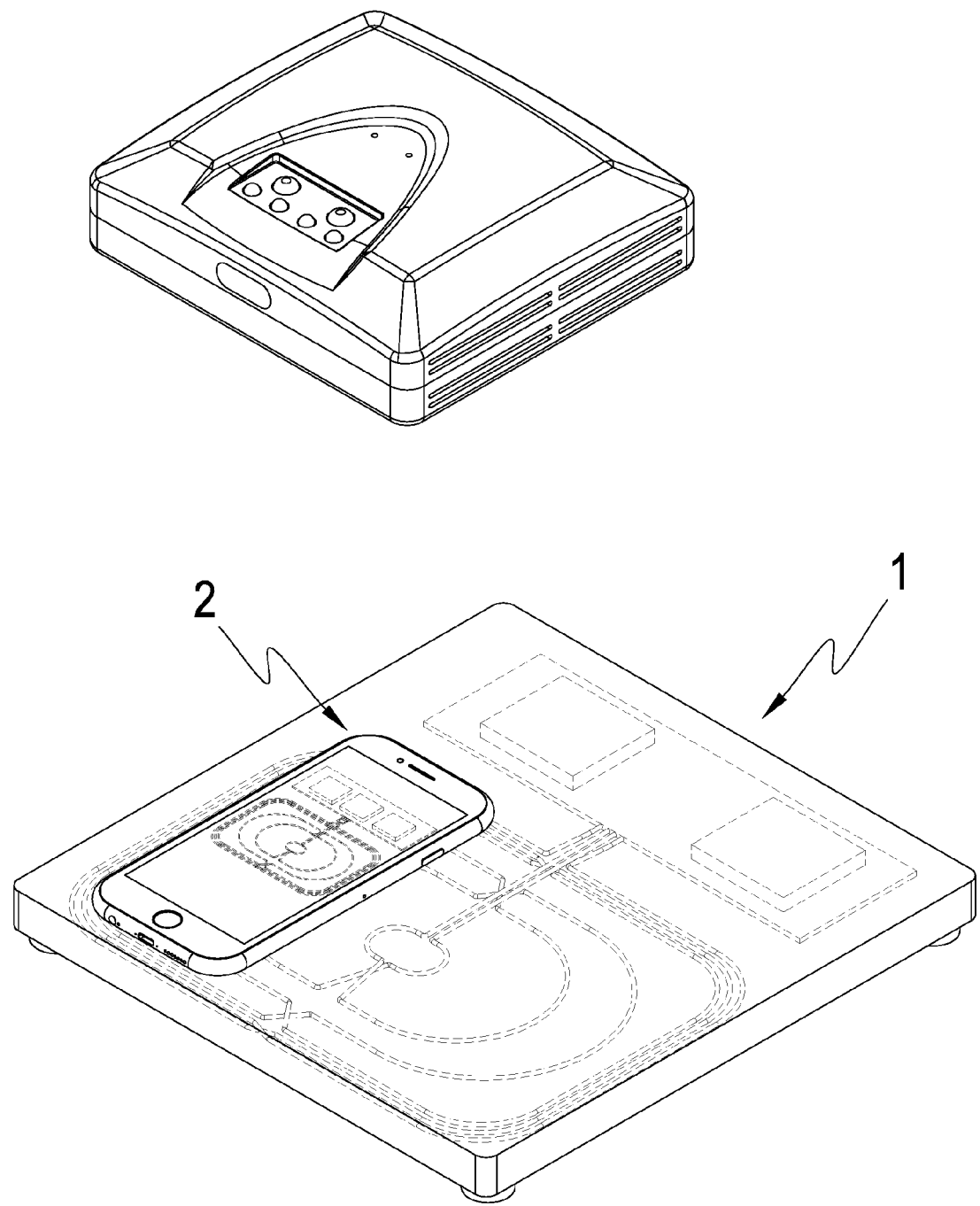
FIG. 4 is a perspective schematic diagram showing an electronic client device placed on the wireless base device in the wireless charging and network connection system of FIG. 2.
Figure 5:
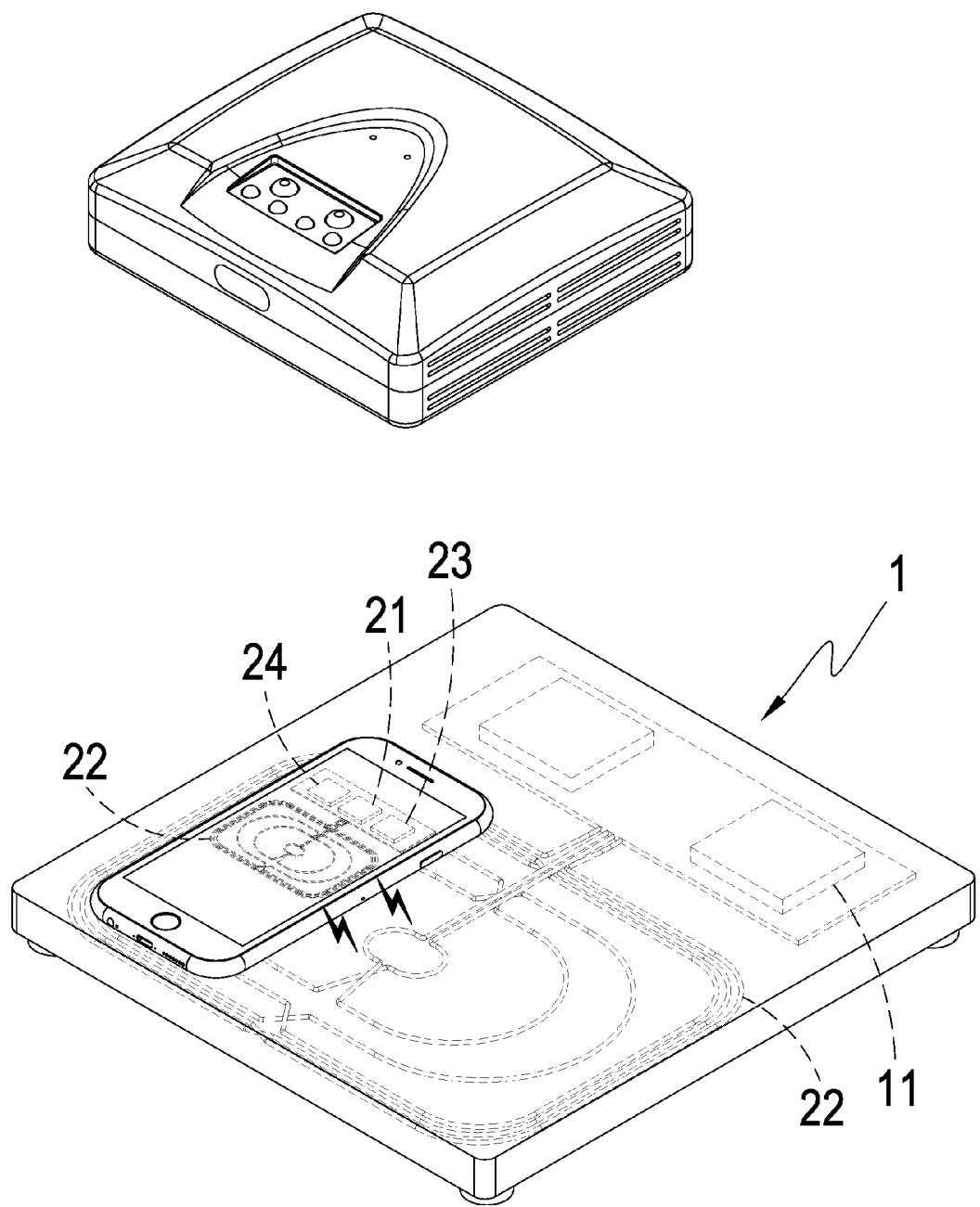
FIG. 5 is a perspective schematic diagram showing the electronic client device wireless charged by the wireless base device in the wireless charging and network connection system of FIG. 2.
Figure 6:
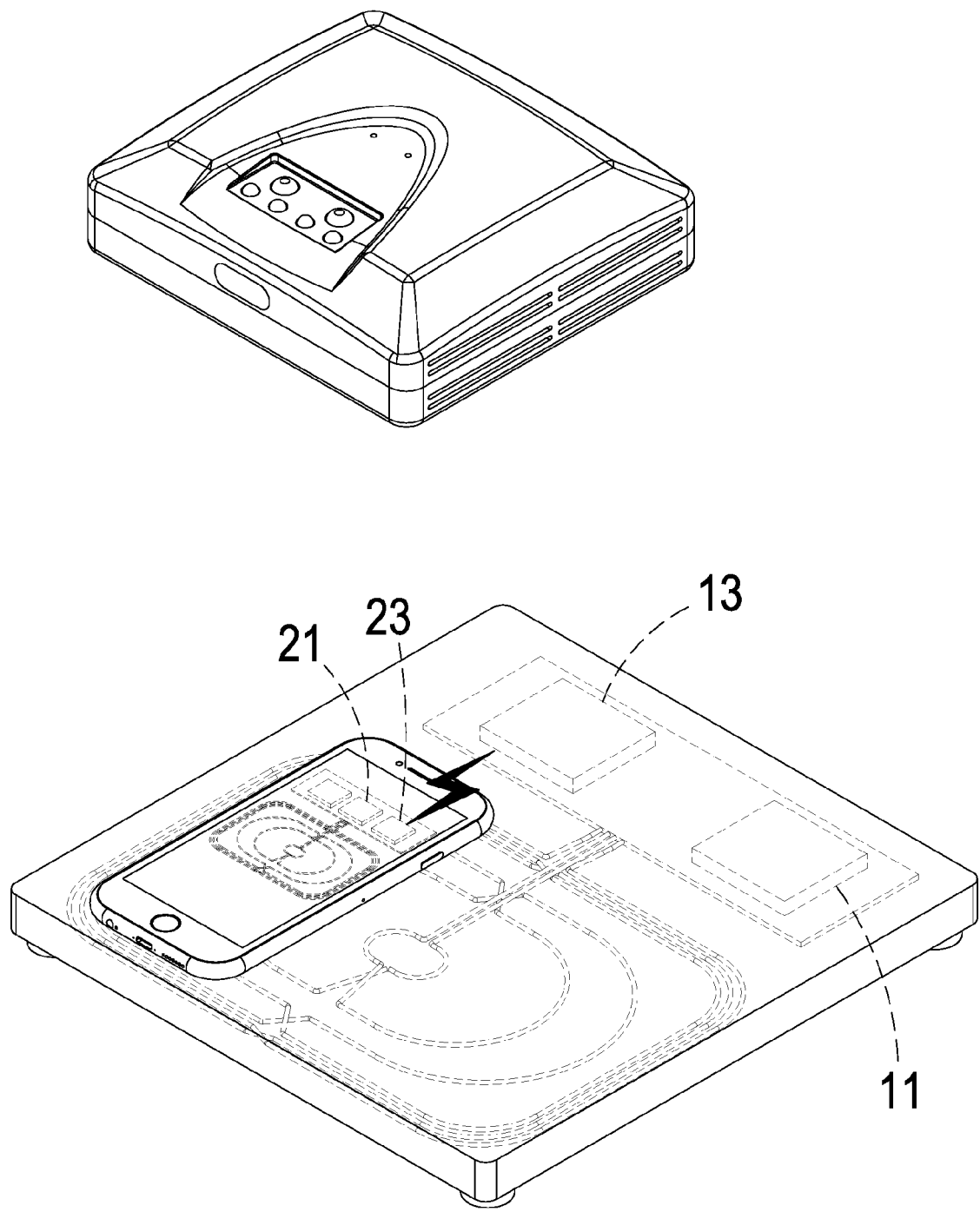
FIG. 6 is a perspective schematic diagram showing the electronic client device paired with the wireless base device in the wireless charging and network connection system of FIG. 2.
Figure 7:
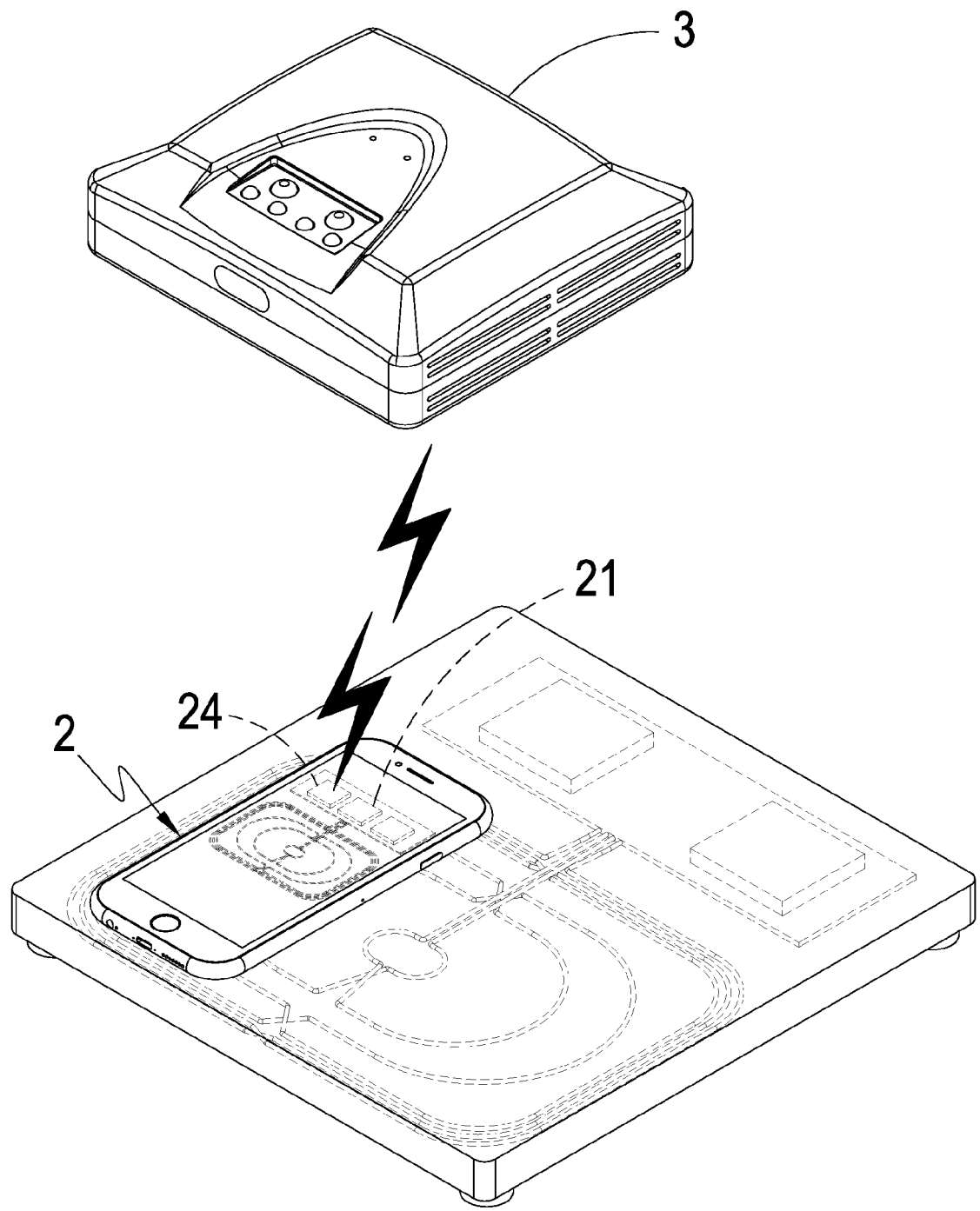
FIG. 7 is a perspective schematic diagram showing the electronic client device connecting to the Internet in the wireless charging and network connection system of FIG. 2.

As shown in FIGS. 1 and 2, a wireless charging and network connection system according to an embodiment of the present invention includes a wireless base device 1 and at least a to-be-charged electronic client device 2 that may be placed on the wireless base device 1. The wireless base device 1 includes at least a wireless first charging member 12, at least an information member 11, and at least a wireless first paring member 13. The wireless first charging member 12 is configured in the wireless base device 1 for transmitting electricity signals. The information member 11 is configured in the wireless base device 1 electrically connected to the wireless first charging member 12 for providing pairing information and connectivity information. The wireless pairing member is configured in the wireless base device 1 electrically connected to the information member 11.

The electronic client device 2 includes a control member 21, at least a wireless second charging member 22, at least a wireless second pairing member 23, and at least a wireless networking member 24. The control member 21 operates according to the pairing information and the connectivity information. The wireless second charging member 22 is electrically connected to the control member 21 and is electrically coupled to the wireless first charging member 12. The wireless second pairing member 23 is data-linked with the control member 21 and paired with the first wireless pairing member 13. The wireless networking member 24 is data-linked and operates along with the control member 21. The wireless networking member 24 is also data-linked with at least a wireless network server 3.

In the present embodiment, the information member 11 is an integrated circuit (IC). The wireless first and second pairing members 13 and 23 communicates through Bluetooth means. The control member 21 is a mobile application (App) controlling the operation of the electronic client device 2. The pairing information includes a name of the wireless first pairing member for Bluetooth pairing process. The connectivity information includes proper account name and password for the wireless network server 3's authentication. What is described above are exemplary and are not intended to limit the present invention.

As shown in FIGS. 1 to 7, a wireless charging and network connection method according to an embodiment of the present invention involves the following major steps: (a) placement, (b) charging, (c) pairing, and (d) networking.

In step (a), a user places the to-be-charged electronic client device 2 on the wireless base device 1. Then, in step (b), the wireless base device 1 transmits electricity signals including the pairing information provided by the information member 11 in a wireless manner. The wireless second charging member 22 receives and is charged by the electricity signals. The wireless second charging member 22 also passes the pairing information to the control member 21. The control member 21 activates the wireless second pairing member 23 and the wireless networking member 24. In step (c), the control member 21 passes the pairing information to the wireless second pairing member 23 which in turn searches for the corresponding wireless first pairing member 13 and conducts pairing. In response, the wireless first pairing member 13 transmits the connectivity information provided by the information member 11 to the paired wireless second pairing member 23 which in turn passes the connectivity information to the control member 21. Finally, in step (d), the control member 21 passes the connectivity information to the wireless networking member 24 so that the wireless networking member 24 locates, logs into, and data-links with the wireless network server 3. As described above, all the user has to do is to place the to-be-charged electronic client device 2 on the wireless base device 1. The to-be-charged electronic client device 2 automatically gains the wireless networking capability and connects to the Internet without any manual involvement, as such achieving great convenience. The user can also places the to-be-charged electronic client device 2 on a near-by different wireless base device 1 so that the to-be-charged electronic client device 2 can switch to connect a different wireless network server 3 so as to obtain better wireless connection signal.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A wireless charging and network connection system, comprising at least an electronic client device and a wireless base device for the optional placement of the electronic client device, wherein
   the wireless base device comprises at least a wireless first charging member, at least an information member, and at least a wireless first paring member, all configured in the wireless base device;
   the wireless first charging member transmits electricity signals to the electronic client device for wireless charging the electronic client device;
   the information member providing pairing information and connectivity information and is electrically connected to the wireless first charging member where the pairing information is incorporated in the electricity signals;
   the wireless first pairing member is electrically connected to the information member and is paired with the electronic client device according to the pairing information; and
   the wireless first pairing member transmits the connectivity information to the electronic client device after pairing so that the electronic client device is able to connect to the Internet according to the connectivity information;
   wherein the electronic client device comprises a control member controlling the operation of the electronic client device according to the pairing information and the connectivity information, and the electronic client device further comprises a wireless second charging member electrically coupled to the wireless first charging member for wireless charging; the wireless second charging member is electrically connected to the control member and passes the pairing information to the control member.

2. The wireless charging and network connection system according to claim 1, wherein the electronic client device further comprises a wireless second pairing member data-linked with the control member; the wireless second pairing member pairs with the wireless first pairing member according to the pairing information; and the wireless second pairing member passes the connectivity information to the control member.

3. The wireless charging and network connection system according to claim 1, wherein the electronic client device further comprises a wireless networking member data-linked with the control member; the wireless networking member data-links with a wireless network server according to the connectivity information so as to access the Internet.

4. A wireless charging and network connection method, comprising the steps of:
   (a) an electronic client device being placed on a wireless base device;
   (b) within the wireless base device, an information member providing pairing information to a wireless first charging member, and the wireless first charging member transmitting electricity signals including the pairing information to the electronic client device for wireless charging the electronic client device;
   (c) within the wireless base device, the information member providing connectivity information to the wireless first pairing member, the wireless first pairing member being paired with the electronic client device functioning according to the pairing information, the wireless first pairing member transmitting the connectivity information to the electronic client device; and (d) the electronic client device connecting the Internet according to the connectivity information;

wherein the pairing information of step (b) and the connectivity information of step (c) are passed to a control member of the electronic client device, and the control member controls the electronic client device accordingly; and wherein, in step (b), a wireless second charging member of the electronic client device receives the electricity signals and wireless charges the electronic client device, and the wireless second charging member passes the pairing information to the control member.

5. The wireless charging and network connection method according to claim 4, wherein, in step (c), after receiving the pairing information, the control member activates a wireless second pairing member; the wireless second pairing member pairs with the wireless first pairing member according to the pairing information; and the wireless second pairing member passes the connectivity information to the control member.

6. The wireless charging and network connection method according to claim 4, wherein, in step (b), after receiving the pairing information, the control member activates a wireless networking member of the electronic client device; and in step (d), the wireless networking member data-links with a wireless network server according to the connectivity information so as to access the Internet.

\* \* \* \* \*